United States Patent
Bilac et al.

(10) Patent No.: US 9,501,803 B2
(45) Date of Patent: Nov. 22, 2016

(54) DEVICES, SYSTEMS, AND METHODS FOR MONITORING ENERGY SYSTEMS

(75) Inventors: Mario Bilac, Lawrenceville, GA (US); Bin Zhang, Taipei (TW); Paul Terricciano, Roswell, GA (US)

(73) Assignee: Siemens Industry, Inc., Alpharetta, GA (US)

(*) Notice: Subject to any disclaimer, the term of this patent is extended or adjusted under 35 U.S.C. 154(b) by 1054 days.

(21) Appl. No.: 12/031,281

(22) Filed: Feb. 14, 2008

(65) Prior Publication Data

US 2008/0255782 A1 Oct. 16, 2008

Related U.S. Application Data

(60) Provisional application No. 60/911,349, filed on Apr. 12, 2007.

(51) Int. Cl.
  *G01R 21/06* (2006.01)
  *G06Q 50/06* (2012.01)

(52) U.S. Cl.
  CPC .................................... *G06Q 50/06* (2013.01)
  USPC .............................. 702/60; 702/65; 702/188

(58) Field of Classification Search
  USPC .......... 702/60–62, 64, 65, 187, 188; 324/86, 324/713, 142; 340/870.01; 700/286, 295; 361/622, 624, 627, 648, 652, 661, 663
  See application file for complete search history.

(56) References Cited

U.S. PATENT DOCUMENTS

| | | | |
|---|---|---|---|
| 6,301,527 B1* | 10/2001 | Butland et al. | 700/286 |
| 6,496,342 B1 | 12/2002 | Horvath | |
| 7,049,976 B2* | 5/2006 | Hunt et al. | 340/870.02 |
| 7,058,524 B2 | 6/2006 | Hayes | |
| 7,248,978 B2 | 7/2007 | Ransom | |
| 7,274,305 B1* | 9/2007 | Luttrell | 340/870.02 |
| 7,342,507 B2* | 3/2008 | Jonker et al. | 340/870.02 |
| 7,453,267 B2* | 11/2008 | Westbrock et al. | 324/522 |
| 7,561,411 B2* | 7/2009 | Johnson, Jr. | 361/600 |
| 2002/0000092 A1 | 1/2002 | Sharood | |
| 2002/0133304 A1 | 9/2002 | Egolf et al. | |
| 2003/0067725 A1 | 4/2003 | Horvath | |
| 2003/0212512 A1 | 11/2003 | Hart | |
| 2004/0083066 A1 | 4/2004 | Hayes | |
| 2004/0162643 A1 | 8/2004 | Sugihara et al. | |
| 2005/0060107 A1 | 3/2005 | Rodenberg, III | |
| 2005/0201044 A1* | 9/2005 | Baca | 361/664 |
| 2006/0271314 A1 | 11/2006 | Hayes | |
| 2007/0168161 A1 | 7/2007 | Vellore | |

FOREIGN PATENT DOCUMENTS

WO   WO 2005/043712 A   5/2005

* cited by examiner

*Primary Examiner* — Hal D Wachsman
*Assistant Examiner* — Ricky Ngon
(74) *Attorney, Agent, or Firm* — Jose R. de la Rosa

(57) ABSTRACT

Certain exemplary embodiments can provide a system, which can comprise a set of electrical energy monitoring devices. Each of the set of electrical energy monitoring devices can be adapted to be mounted in a circuit breaker panel substantially adjacent to a corresponding circuit breaker. The system can comprise an energy monitoring master controller adapted to be communicatively coupled to each of the set of electrical energy monitoring devices.

24 Claims, 4 Drawing Sheets

DEVICES, SYSTEMS, AND METHODS FOR MONITORING ENERGY SYSTEMS

CROSS-REFERENCES TO RELATED APPLICATIONS

This application claims priority to, and incorporates by reference herein in its entirety, pending U.S. Provisional Patent Application Ser. No. 60/911,349, filed 12 Apr. 2007.

BACKGROUND

United States Patent Publication 20070168161 (Vellore), which is incorporated by reference herein in its entirety, discloses a "method and system for monitoring and configuring power transmission equipment for use by utility companies. The method and system use independently operating hardware/software platforms to distribute the processing functions of the system. The system consists of a front end manager and a communications manager operating on independent platforms. The front end manager and communications manager communicate via any type of network such as LAN, WAN or even the World Wide Web. The front end manager interfaces to a user and provides a graphical user interface (GUI) to allow the user to configure and monitor power devices. The communications manager communicates with the power devices and passes information to and from the user. The system can have multiple front end managers communicating to multiple communications managers simultaneously." See Abstract.

U.S. Pat. No. 7,058,524 (Hayes), which is incorporated by reference herein in its entirety, discloses that a "wireless electrical power metering system is provided. A processor having a multichannel power line transceiver, a wireless transceiver, and a power meter attached thereto measures power consumption information on a power line inductively coupled with the power meter. The processor converts the power consumption information into IP-based data, and transmits same over the wireless transceiver. The information can be wirelessly received by a remote monitoring station or transmitted across the Internet for storage, analysis, and billing. The processor generates appliance control signals and generates same across the multichannel power line transceiver to remotely control appliances in response to power consumption trends. The processor provides firewall capabilities, and relays information between a wired or wireless network and a power line network, thereby expanding the size of existing household networks. Further, the processor allows multiple dwellings to be networked using power lines, and households to be connected to the Internet via a power line network." See Abstract.

United States Patent Publication 20030067725 (Horvath), which is incorporated by reference herein in its entirety, discloses a "method and system for monitoring and configuring power transmission equipment for use by utility companies. The method and system use independently operating hardware/software platforms to distribute the processing functions of the system. The system consists of a front end manager and a communications manager operating on independent platforms. The front end manager and communications manager communicate via any type of network such as LAN, WAN or even the World Wide Web. The front end manager interfaces to a user and provides a graphical user interface (GUI) to allow the user to configure and monitor power devices. The communications manager communicates with the power devices and passes information to and from the user. The system can have multiple front end managers communicating to multiple communications managers simultaneously." See Abstract.

SUMMARY

Certain exemplary embodiments can provide a system, which can comprise a set of electrical energy monitoring devices. Each of the set of electrical energy monitoring devices can be adapted to be mounted in a circuit breaker panel substantially adjacent to a corresponding circuit breaker. The system can comprise an energy monitoring master controller adapted to be communicatively coupled to each of the set of electrical energy monitoring devices.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
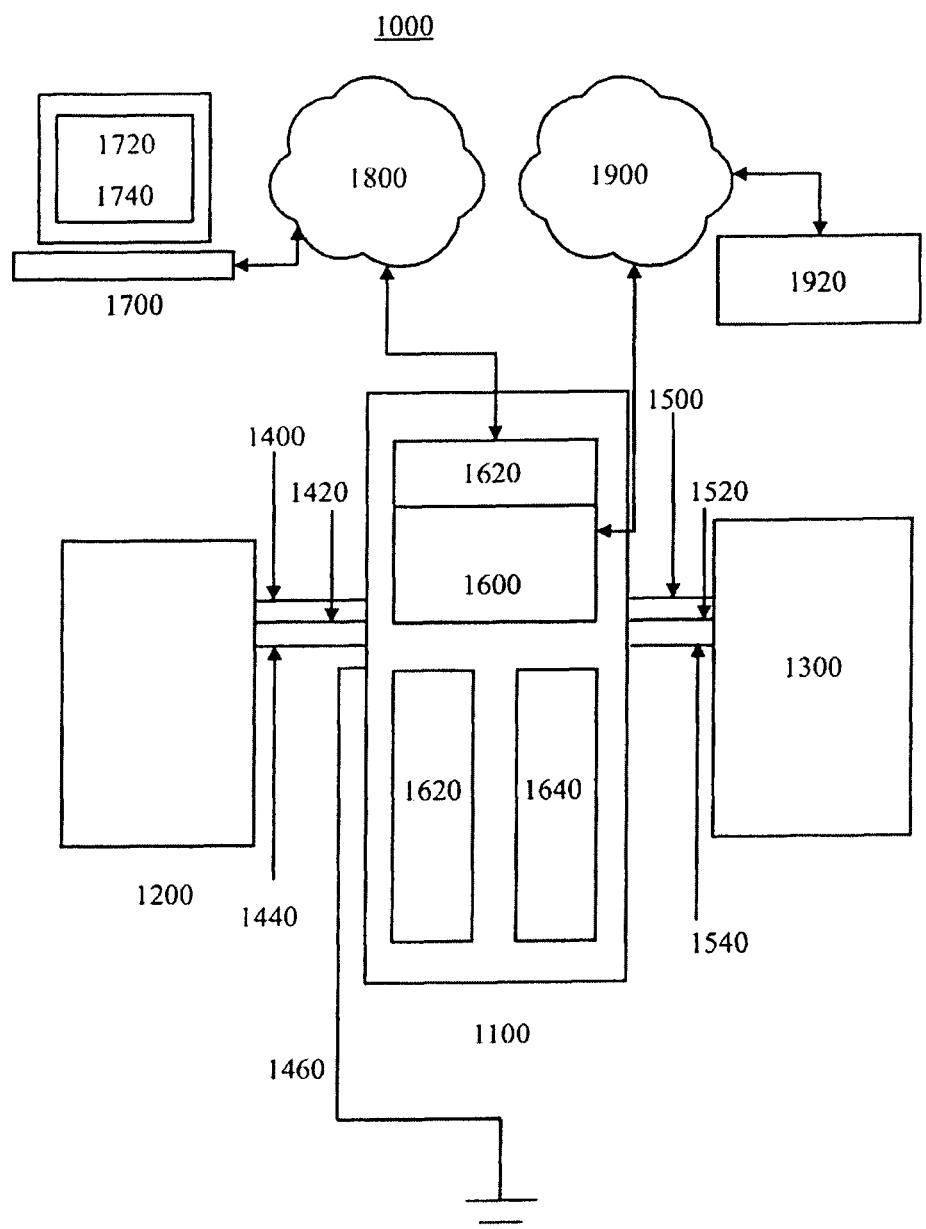
FIG. 1 is a block diagram of an exemplary embodiment of a system 1000.

Certain exemplary embodiments can provide a system, which can comprise a set of electrical energy monitoring devices. Each of the set of electrical energy monitoring devices can be adapted to be mounted in a circuit breaker panel substantially adjacent to a corresponding circuit breaker. The system can comprise an energy monitoring master controller adapted to be communicatively coupled to each of the set of electrical energy monitoring devices.

Certain exemplary embodiments can be adapted to monitor many loads being serviced from a distribution panel. Certain exemplary systems can be adapted to:

- measure voltages, currents, energy, and/or power on each circuit branch of a plurality of circuit branches;
- service 42 single-phase loads and/or eight three-phase loads along with neutral and ground or a combination of neutral and ground;
- perform alarming functions on voltage, current, power, and/or sequence on three-phase loads'
- provide a local display of measured values and/or active alarms;
- annunciate alarms via relay contacts;
- provide a means of locally clearing active alarms; and/or
- provide network interfaces to supervisory systems via MODBUS, TCP/IP, BACNet, and/or Liebert Centralized Monitoring Protocol.

Table I describes specific exemplary parameters that can be monitored by an exemplary system for each line in a 3 phase system.

TABLE I

| Items | Description | Units |
|---|---|---|
| 1 | Volts Phase A - B | Volts |
| 2 | Volts Phase B - C | Volts |

TABLE I-continued

| Items | Description | Units |
|---|---|---|
| 3 | Volts Phase C - A | Volts |
| 4 | Volts Phase A - Neutral | Volts |
| 5 | Volts Phase B - Neutral | Volts |
| 6 | Volts Phase C - Neutral | Volts |
| 7 | Amps Phase A | Amps |
| 8 | Amps Phase B | Amps |
| 9 | Amps Phase C | Amps |
| 10 | Amps Neutral | Amps |
| 11 | Amps System Ground | Amps |
| 12 | Frequency | Hertz |
| 13 | Apparent Power (KVA) | Kilo |
| 14 | Power Factor | Degrees |
| 15 | Real Power (KW) | Kilo |
| 16 | Reactive Power (QVARS) | Kilo |
| 17 | Percent Load | Percent |
| 18 | Demand | Kilowatt |
| 19 | Peak Demand | Kilowatt |
| 20 | Peak Demand Period | Time |
| 21 | Max Current Phase A | Amps |
| 22 | Max Current Phase A | Time |
| 23 | Max Current Phase B | Amps |
| 24 | Max Current Phase B | Time |
| 25 | Max Current Phase C | Amps |
| 26 | Max Current Phase C | Time |
| 27 | Max Volts Phase A - B | Volts |
| 28 | Max Volts Phase A - B | Time |
| 29 | Max Volts Phase B - C | Volts |
| 30 | Max Volts Phase B - C | Time |
| 31 | Max Volts Phase C - A | Volts |
| 32 | Max Volts Phase C - A | Time |
| 33 | Max Volts Phase A - N | Volts |
| 34 | Max Volts Phase A - N | Time |
| 35 | Max Volts Phase B - N | Volts |
| 36 | Max Volts Phase B - N | Time |
| 37 | Max Volts Phase C - N | Volts |
| 38 | Max Volts Phase C - N | Time |

Table II describes exemplary parameters that can be monitored for each line in certain exemplary single phase systems.

TABLE II

| Items | Description | Units |
|---|---|---|
| 1 | Volts | Volts |
| 2 | Amps | Amps |
| 3 | Amps Neutral | Amps |
| 4 | Frequency | Hertz |
| 5 | Apparent Power (KVA) | Kilowatts |
| 6 | Power Factor | Degrees |
| 7 | Real Power (KW) | Kilowatts |
| 8 | Reactive Power | Kilowatts |
| 9 | Percent Load | Percent |
| 10 | Demand | Kilowatt hours |
| 11 | Peak Demand | Kilowatt hours |
| 12 | Peak Demand Period | Time |
| 13 | Max Current | Amps |
| 14 | Max Current Period | Time |
| 15 | Max Volts | Volts |
| 16 | Max Volts Period | Time |

Certain exemplary embodiments might not store a history of one or more of the parameters of Table I and/or Table II. Certain exemplary embodiments can be adapted to store a history, such as for a predetermined time period for one or more of the parameters of Table I and/or Table II.

Certain exemplary systems can comprise a user interface adapted to render one or more notifications, such as a high visibility user interface that utilizes a standard of approximately one inch of character height. Certain exemplary embodiments can be adapted to render parameter data that can have a character height of approximately 0.2 inches. The one or more notifications can be alarms rendered responsive to one or more measured and/or derived parameters exceeding a predetermined threshold. Certain exemplary embodiments can utilize a color user interface as a relatively powerful means of enhancing the readability, and therefore usefulness of the user interface.

The user interface can be adapted to display one or more measured parameters of each monitored circuit branch. In certain exemplary systems configured for three-phase distribution, the user interface can be adapted to render one or more or three measured voltages, line to line or line to neutral, substantially simultaneously. The user interface can be adapted to render one or more of four currents, three phases, and/or neutral substantially simultaneously. The user interface can have an autos-scan mode that can scroll through two or more measured parameters.

When the monitoring system measures a parameter that is outside of a configured allowable range, the system user interface can be adapted to render a notification and/or alarm indicator and can be adapted to render an associated test message. In certain exemplary embodiments, alarm conditions to be detected and/or annunciated can be as shown in Table III.

TABLE III

| Alarm | Default Threshold |
|---|---|
| 1. Over Voltage | >6% of Nominal |
| 2. Under Voltage | <13% of Nominal |
| 3. Over Current | >95% of Full Load Amps |
| 4. Under Current | None |
| 5. Phase Sequence Error | Enabled |
| 6. Phase Loss | Disabled |
| 7. Frequency Error | ±0.5% of Nominal |
| 8. Neutral Overcurrent | >95% of Full Load Amps |
| 9. Ground Overcurrent | >5 Amps |
| 10. Transformer Over Temperature | Disabled |

Certain exemplary embodiments can be adapted to perform one or more of the following functions:
emergency power cutoff;
alarm silence;
individual alarm reset;
reset all alarms
alarm disable, which can be password protected;
pause scrolling through of system parameter data; and/or
manual scrolling and/or selection of parameter data for display.

Certain exemplary embodiments can provide five contacts (e.g., four can be normally open and one can be normally closed), which can be mapped to any of a plurality of predetermined alarm conditions. An active alarm can energize a relay mapped to the active alarm.

Certain exemplary embodiments can provide two or more digital inputs rated for a system control voltage. These two or more digital inputs can be mapped to a transformer over temperature alarm.

Certain exemplary embodiments can provide a communication interface to one or more external networks. Certain exemplary embodiments can provide an RS-422 interface (e.g., via two twisted differential pairs), which can be rated to communicate at a baud rate. The RS-422 interface can have selectable parity and/or stop bit settings. Certain exemplary embodiments can support one or more of a Liebert Centralized Monitoring protocol and a Modbus Remote Terminal Unit (RTU) protocol. The Liebert protocol can be supported up to a maximum baud rate. Messages sent via the Liebert protocol can be adapted to communicate measured parameters from one or more metering nodes and/or to clear active alarms.

When the RS-422 interface is configured for communications via the Modbus protocol, the RS-422 interface can act as a Modbus Slave. The RS-422 interface can be enabled and active after certain exemplary embodiments have been configured for a particular Modbus slave address and an RS-422 channel explicitly enabled. The Modbus commands supported can comprise one or more of the exemplary commands of Table IV.

TABLE IV

| Modbus Function | Data Available |
| --- | --- |
| Function 01: Read Coil Status | Individual Alarm Reset Status |
| Function 02: Read Input Status | Individual Alarm Status |
| Function 03: Read Holding Registers | Metering Parameter Data |
| Function 04: Read Input Registers | Multiple Alarm Status |
| Function 05: Force Single Coil | Reset Single Alarm |
| Function 07: Read Exception Status | Read Power Monitoring System Status |
| Function 08: Diagnostics | Communication |
| Function 11: Fetch Comm Event Counter | Reads Modbus Comm Event Counters |
| Function 15: Force Multiple Coils | Reset Multiple Alarms |
| Function 16: Preset Multiple Registers | Write Alarm Set points and Configuration Data |
| Function 17: Report Slave ID | Reads Slave Type and address |
| Function 20: Read General Reference | Read Custom Alarm Messages |
| Function 21: Write General Reference | Write Custom Alarm Messages |

Certain exemplary embodiments can provide an RS-232 interface, such as via a nine-pin D Shell, which can be communicatively coupled to an information device and/or I/O device via a straight through cable. The RS-232 interface can be adapted to support commissioning. Certain exemplary embodiments can provide a single Ethernet category 5 connection via an RJ45 Jack. The RJ45 jack can support the following protocols:
- the BACNet protocol, which can be used to transmit measured parameter data, read alarm conditions, and/or information regarding active alarms and/or the clearing of active alarms;
- the MODBUS protocol such as via the RS-422 interface; and/or
- the Ethernet protocol which can be used by an embedded web page server.

The embedded web page serve can allow a commissioning tool to be embedded in the Power Monitoring System and might not require certain software to be installed on an information device of a user. The web page server can be adapted to provide measured parameter data to a web browser of an information device communicatively coupled to the network. Password protection can be used to access the system. Certain exemplary embodiments might lack an RS-232 interface thereby eliminating a cost of an RS-232 Physical Layer.

Certain exemplary embodiments can utilize an energy monitoring master controller and a set of electrical energy monitoring devices. The set of electrical energy monitoring devices can be communicatively coupled to the energy monitoring master controller via an RS-485 half duplex multi-drop communications link. The baud rate for the half duplex multi-drop communications link can exceed 100,000, which can by greater than expected throughput in certain exemplary embodiments.

Certain exemplary embodiments can utilize two types of metering cards. The two cards can be a single phase card and a three phase card. Each card can use a dedicated signal processing circuit from Analog Devices to process analog signals from current transformers and/or potential transformers. The single phase card can be adapted to monitor twenty one single phase lines which can be on a common feeder circuit, which can allow a use of a single potential transformer. Each card can comprise a single additional microprocessor, which can interface with signal processing circuits of the energy monitoring master controller. In certain exemplary embodiments, the single phase card can be adapted, when properly connected, to provide information regarding two phase or three phase circuit branches. In certain exemplary embodiments, the three phase card can be adapted, when properly connected, to provide information regarding one phase or two phase circuit branches.

The energy monitoring master controller can collect metered data from metering cards in the system. The energy monitoring master controller can organize the data and/or format the data for communication to different systems communicatively coupled to the energy monitoring master controller. The energy monitoring master controller can perform alarm functionality and/or commissioning. If operated in a stand-alone environment, the energy monitoring master controller can provide trending and history functions. The energy monitoring master controller can comprise a user interface.

The energy monitoring master controller can be a single board computer. The energy monitoring master controller can run one or more of the following operating systems: Linux, Windows CE, and a hard Real-Time operating system such as VxWorks. The energy monitoring master controller can support an available TCP/IP protocol stack and/or an Ethernet interface. The energy monitoring master controller can support multiple serial communications ports and digital I/O. The energy monitoring master controller can have onboard support for user interface devices such as LCD displays, keypads, keyboards. The energy monitoring master controller can be scalable in both processor resources (i.e. faster clock speeds), caching, and memory. The energy monitoring master controller can have non-volatile storage for storage of commissioning parameters and alarm status. Software of the energy monitoring master controller can be field upgradeable without having to remove an executive board from the Power Monitoring System. Software of the energy monitoring master controller can be resident on a commercially available flash card, which can be exchanged to upgrade the system and/or provide maintenance releases of the software.

Certain exemplary embodiments can utilize an information device that comprises one or more of the following exemplary features:
- a full-featured single board computer on a module;
- an Intel XScale PXA255 central processing unit (CPU) with up to 400 megahertz (MHz), 32+32 kilobit (KB) cache (available from Intel Corp. of Santa Clara, Calif.);
- a general purpose bus and optional Peripheral Component Interconnect (PCI), LPC, AC97 busses;
- 16-64 megabyte synchronous dynamic random access memory (SDRAM);
- a 1-128 megabyte clash disk,
- a graphics controller for STN and TFT panels;
- a Personal Computer Memory Card International Association (PCMCIA) controller;
- a sound codec with speaker and microphone support;

a slave and host Universal Serial Bus (USB) ports;
a standard peripherals: serial ports, Line Printer (LPT) port, Input/Output (I/O) ports, floppy disk controller (FDC), PS/2 keyboard and mouse, Infrared Data Association (IrDA), hard disk drive (HDD) interface; and/or
a 10/100 BaseT Ethernet port.

Certain exemplary embodiments can use a commercial operating system that uses developed low level software. Certain exemplary embodiments can use Linux as a core operating system. Software can be developed using languages such as C++ and C# on a Windows CE platform.

The energy monitoring master controller can provide a local user interface for certain exemplary embodiments. The energy monitoring master controller can be used for reviewing the metered data and/or annunciating alarms with preconfigured text. The energy monitoring master controller can be also used for performing some diagnostic tests and/or troubleshooting.

The energy monitoring, master controller can comprise a 320×240 color liquid crystal display (LCD) display with a touch screen. The LCD display can be a graphical bitmapped display with capability of displaying characters of varying character heights. Metered data can be displayed in a manner which puts the most data on the screen as practical while alarms can be annunciated in large letters that can be viewed from across a room and in red to indicate a problem. The user can interact with certain exemplary embodiments via a touch screen, which can provide soft menus via rendered keypads and/or buttons. Certain exemplary embodiments can use a 4×20 fixed display with either a keypad or operators on a system panel. Certain exemplary embodiments can use point-to-point wiring of the panel. The discrete operator and keypad options can use additional I/O on a board of the energy monitoring master controller.

A graphical display can allow for display of information in an appropriate size. Data can be displayed in small text to allow a relatively large amount of information to be presented. Alarms can be displayed in large text to be relatively visible. Color can be used to indicate status and urgency. In certain exemplary embodiments, the data can be provided upstream to another monitoring system and/or information device. The touch pad embedded in the display can provide flexibility for user interface functionality. A flexible user interface makes adding additional user interface functions relatively simple. Two physical layers can be supported for communications with information devices communicatively coupled to one or more networks. The two communication interfaces can be an RS-422 two differential pair full duplex interface and/or an Ethernet 10/100BaseT interface.

The RS-422 interface can operate at a baud rate as appropriate for Liebert Centralized Monitoring. An executive processor board can provide a Universal Asynchronous Receiver/Transmitter (UART) to generate signals on the RS-422 interface. Support to generate appropriate RS-422 signal levels can be provided by a communication interface board. Upper levels of the RS-422 interface can be defined by characteristics of a Liebert Centralized Monitoring system.

The Ethernet interface can be supported by the energy monitoring master controller. The operating system can provide a TCP/IP protocol stack which can provide a "Berkeley Sockets" application interface to the protocol stack. The hardware can automatically determine whether the Ethernet network to which it is connected is 10 or 100 megabits per second and automatically configure itself to at the appropriate transmission rate. The executive configuration can have two RJ45 Ethernet jacks. One jack can be communicatively coupled to a supervisory network while the second jack can be communicatively coupled to an information device of a user associated with a circuit branch. The energy monitoring master controller can be adapted to provide a HTTP (web pages) connection that communicates with a web browser on the information device of a user associated with the circuit branch. A web browser interface can allow both monitoring of power information and configuring of certain exemplary systems. The Ethernet connections can support Modbus TCP/IP when a connection is made to an appropriate port. BACNet can be supported when a connection is made to an appropriate port. The energy monitoring master controller can support Modbus TCP/IP and BACNet.

Certain exemplary embodiments can utilize a web based configurator, which can be embedded in the energy monitoring master controller. The configurator functionality can be provided with updates to software in the energy monitoring master controller. The embedded web browser can allow a customer to remotely configure and/or monitor certain exemplary embodiments from a computer on a network with a web browser that is communicatively coupled to the energy monitoring master controller. An elaborate or simple security scheme can be utilized which can protect the system from unauthorized, inadvertent, and malicious modifications.

FIG. 1 is a block diagram of an exemplary embodiment of a system 1000, which can comprise a circuit breaker panel 1100. Circuit breaker panel 1100 can be utilized to electrically couple an electrical source 1200 to an electrical load 1300, which can be a circuit branch to which electrical energy is supplied from electrical source 1200. Electrical load 1300 can be associated with a home, factory, office building, commercial warehouse, store, government building, construction site, sports facility, mobile plant, camp site, recreational facility, trailer home, emergency site, and/or farm, etc.

Circuit breaker panel 1100 can comprise a first set of circuit breakers 1620 and a second set of circuit breakers 1640. Each of first set of circuit breakers 1620 and second set of circuit breakers 1640 can be electrically coupled to and monitored by a corresponding set of electrical energy monitoring devices. Components comprised by circuit breaker panel 1100 can be operably energizable by 100 volts or greater. A first plurality of conductors can electrically couple electrical source 1200 to components comprised by circuit breaker panel 1100. The first plurality of conductors can comprise a first source conductor 1400, a second source conductor 1420, and a third source conductor 1440. A ground 1460 can be electrically coupled to a component of circuit breaker panel 1100. Each of first source conductor 1400, second source conductor 1420, third source conductor 1440, and/or ground 1460 can be operably connectable to one or more circuit breakers, such as one or more of first set of circuit breakers 1620 and second set of circuit breakers 1640.

Circuit breaker panel 1100 can be adapted to operatively mount a first strip substantially adjacent to first subset of circuit breakers 1620 and a second strip substantially adjacent to second set of circuit breakers 1640. Each of the set of electrical energy monitoring devices can be adapted to be placed on one of the first strip and the second strip 1640. In certain exemplary embodiments, circuit panel 1100 can be adapted to dissipate heat energy resulting from changing electromagnetic fields associated with the set of electrical energy monitoring devices, each of first subset of circuit breakers 1620, and second set of circuit breakers 1640.

In certain exemplary embodiments, the set of electrical energy monitoring devices can be comprised by corresponding circuit breakers in each of first subset of circuit breakers 1620 and second set of circuit breakers 1640. In such embodiments, each of first subset of circuit breakers 1620 and second set of circuit breakers 1640 can be adapted to dissipate heat energy resulting from changing electromagnetic fields associated with the set of electrical energy monitoring devices.

A second plurality of conductors can electrically couple electrical load 1300 to one or more components comprised by circuit breaker panel 1100. The second plurality of conductors can comprise a first load conductor 1500, a second load conductor 1520, and a third load conductor 1540. Each of second load conductor 1520, third load conductor 1540, and/or ground 1460 can be operably connectable to one or more circuit breakers, such as one or more of first set of circuit breakers 1620 and second set of circuit breakers 1640.

In certain exemplary embodiments, the set of electrical energy monitoring devices can be communicatively coupled to an energy monitoring master controller 1600. In certain exemplary embodiments, energy monitoring master controller 1600 can comprise a touch screen. Energy monitoring master controller 1600 can be mounted in circuit breaker panel 1100 in certain monitoring systems (e.g., large systems). In certain exemplary embodiments, Energy monitoring master controller 1600 can be a personal computer with communication and/or server type capability.

Energy monitoring master controller 1600 can comprise a web page server 1620 that can be connectable to a first network 1800, such as the Internet. Web page server 1620 can be adapted to provide circuit breaker information from each of the set of electrical energy monitoring devices via a web page. The web page can be transmitted to and/or received by an information device 1700. Information device 1700 can comprise a user interface 1720 and a user program 1740. User program 1740 can be adapted to receive and/or analyze information regarding each of the set of energy monitoring devices and/or information regarding electrical load 1300. Information received and/or analyzed by user program 1740 can be rendered to a user of information device 1700 by user interface 1720. Energy monitoring master controller 1600 can be communicatively coupled to a plurality of meters 1920 via a second network 1900 utilizing a MODBUS protocol. Second network 1900 can be a wired, wireless, or power line carrier hardware network implementing MODBUS or a similar protocol.

Energy monitoring master controller 1600 can be adapted to:
provide a notification and/or an alarm if a voltage measured in system 1000 exceeds a predetermined threshold;
provide a notification and/or an alarm if a voltage measured in system 1000 is less than a predetermined threshold;
provide a notification and/or an alarm if an electrical current in system 1000 exceeds a predetermined threshold;
provide a notification and/or an alarm if a phase angle in system 1000 deviates from a predetermined threshold by a predetermined amount;
provide a notification and/or an alarm if a phase in system 1000 is reversed as compared to a predetermined phase;
provide a notification and/or an alarm if a phase angle in system 1000 deviates from a predetermined threshold by a predetermined amount;
provide a notification and/or an alarm if an electrical frequency in system 1000 exceeds a predetermined threshold;
provide a notification and/or an alarm if an electrical frequency in system 1000 is less than a predetermined threshold;
provide a notification and/or an alarm responsive to a determination that a real power measurement exceeds a predetermined threshold;
provide a notification and/or an alarm responsive to a determination that a reactive power measurement exceeds a predetermined threshold;
provide a notification and/or an alarm responsive to a determination that a total power measurement exceeds a predetermined threshold;
provide a notification and/or an alarm responsive to a determination that a count of kilowatt-hours exceeds a predetermined threshold;
provide a notification and/or an alarm responsive to a determination that a monetary value of energy usage exceeds a predetermined threshold;
provide a notification and/or an alarm responsive to a determination that a monetary value of energy usage exceeds a predetermined threshold, the predetermined threshold can be entered as a monetary value corresponding to a cost of a predetermined count of kilowatt-hours via a monetary value web page provided by energy monitoring master controller 1600;
render values measured by system 1000 via a local user interface; and/or
provide information to a billing system, the billing system can be adapted to provide a bill associated with energy usage by electrical load 1300 of the corresponding circuit branch.

Figure 2:
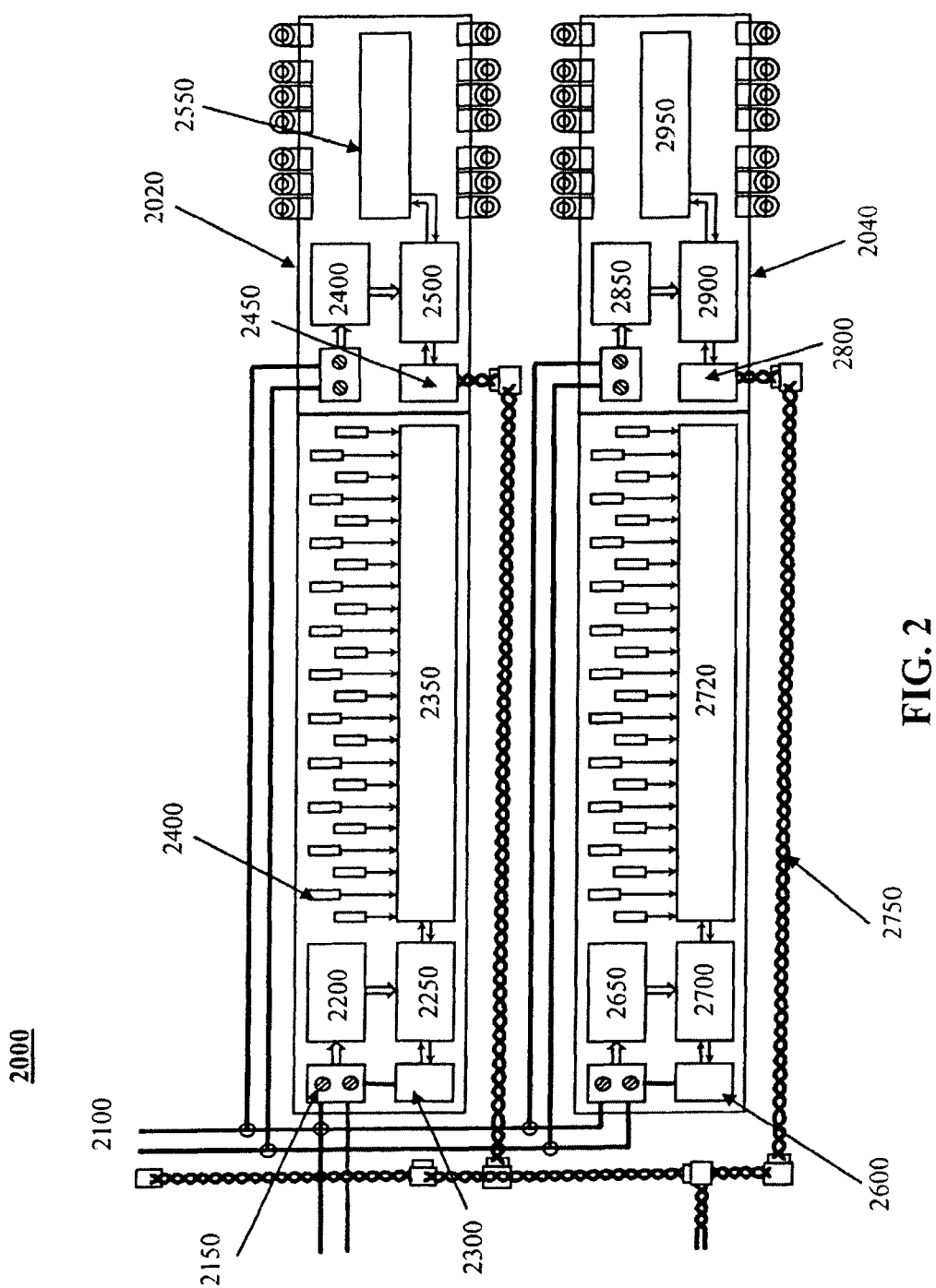
FIG. 2 is a block diagram of an exemplary embodiment of a system 2000.

FIG. 2 is a block diagram of an exemplary embodiment of a system 2000, which can comprise a first strip 2020 and a second strip 2040. Each of first strip 2020 and second strip 2040 can comprise a corresponding set of electrical energy monitoring devices 2400, which can comprise toroidal current transformers. Each current transformer can be associated with an individual hot line for provision of a measurement of electrical current to a corresponding circuit branch. Each of first strip 2020 and second strip 2040 can be electrically coupled to an electrical energy source 2100. In certain exemplary embodiments, electrical energy source 2100 can provide electrical energy at an electrical energy at a voltage of approximately 110 alternating current volts or approximately 210 alternating current volts.

Each of set of electrical energy monitoring devices 2400 can be adapted to determine an energy usage by a corresponding circuit branch electrically coupled to an electrical energy source via a corresponding circuit breaker. The energy usage can be determined via a measured voltage relative to neutral at the corresponding circuit breaker and a current flow through the corresponding circuit breaker. Each of set of electrical energy monitoring devices 2400 can be adapted to be mounted in a circuit breaker panel. In certain exemplary embodiments, each of set of electrical energy monitoring devices 2400 can be adapted to be mounted substantially adjacent to the corresponding circuit breaker. In certain exemplary embodiments, each of set of electrical energy monitoring devices 2400 can be adapted comprised by the corresponding circuit breaker. In embodiments wherein each of set of electrical energy monitoring devices 2400 is comprised by the corresponding circuit breaker, set of electrical energy monitoring devices 2400 can be communicatively coupled to one of first analog device integrated circuit 2350 and third analog device integrated circuit 2720.

Each of first analog device integrated circuit 2350 and third analog device integrated circuit 2720 can be adapted to process electrical current and/or electrical voltage information from set of electrical energy monitoring devices 2400. Each of first analog device integrated circuit 2350 and third analog device integrated circuit 2720 can be adapted to communicate information associated with set of electrical energy monitoring devices 2400 to the energy monitoring master controller. Each of set of electrical energy monitoring devices 2400 can be operably yet non-simultaneously couplable to each of a single phase alternating current circuit branch and a three phase alternating current circuit branch.

First strip 2020 and second strip 2040 can be electrically coupled to a voltage source of each circuit branch of a plurality of circuit branches, each circuit branch can be associated with a corresponding circuit breaker of the set of circuit breakers electrically coupled to first strip 2020 and second strip 2040. An electrical potential of the voltage source can be measured across a pair of terminals 2150 of first strip 2020. First strip 2020 can comprise a first power supply 2200, a first microprocessor controller 2250, a first power line carrier 2300, a first analog device integrated circuit 2350, a second power supply 2400, a first RS 485 interface 2450, a second microprocessor controller 2500, and a second analog device integrated circuit 2550.

Second strip 2040 can comprise a third power supply 2650, a third microprocessor controller 2700, a second power line carrier 2600, a third analog device integrated circuit 2720, a second RS 485 interface 2800, a fourth power supply 2850, a fourth microprocessor controller 2900 and a fourth analog device integrated circuit 2950.

In certain exemplary embodiments, each of first analog device integrated circuit 2350 and third analog device integrated circuit 2720 can be an ADE7753 microprocessor or an ADE7758 microprocessor (each available from Analog Devices of Norwood, Mass.). In certain exemplary embodiments, each of second analog device integrated circuit 2550 and fourth analog device integrated circuit 2950 can be an ADE7758 microprocessor. Each of first power line carrier 2300 and second power line carrier 2600 can be adapted to communicate with one or more controllers and/or information devices via a MODBUS protocol.

Each of set of electrical energy monitoring devices 2400 can comprise a current sensor that can be adapted to measure an electrical current flowing through the corresponding circuit branch. Each of set of electrical energy monitoring devices 2400 can comprise a device adapted to determine and/or measure a flow of electrical power based upon the current sensor and an electrical potential measured via voltage sensor adapted to measure an electrical voltage of one or more circuit branches. For example, each of set of electrical energy monitoring devices 2400 can be adapted to measure and/or determine active power, reactive power, and/or total power.

Each of set of electrical energy monitoring devices 2400 can comprise a device adapted to determine a power factor. Each of set of electrical energy monitoring devices 2400 can comprise a current transformer, such as a toroidal current transformer or a Rogowski coil. Each of set of electrical energy monitoring devices 2400 can be adapted to monitor a characteristic of a phase of an alternating current associated with system 2000.

Each of first RS 485 interface 2450 and second RS 485 interface 2800 can be network interfaces. Via first RS 485 interface 2450 and second-RS 485 interface 2800 information regarding system 2000, and/or circuit branches electrically coupled thereto, can be provided to an energy monitoring master controller and/or an information device via a network.

Figure 3:
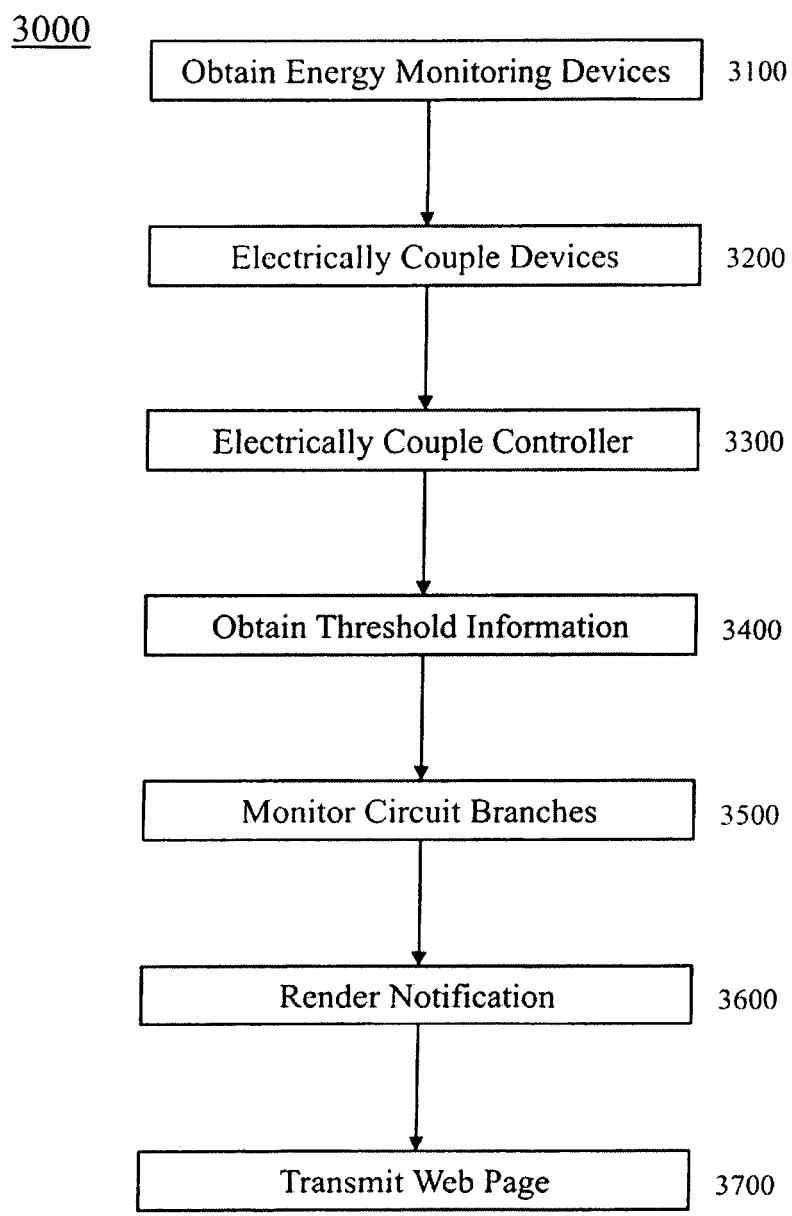
FIG. 3 is a flowchart of an exemplary embodiment of a method 3000.

FIG. 3 is a flowchart of an exemplary embodiment of a method 3000. At activity 3100, a set of electrical energy monitoring devices can be obtained. Each of the set of electrical energy monitoring devices can be adapted to determine an energy usage by a corresponding circuit branch electrically coupled to an electrical energy source via a corresponding circuit breaker. The energy usage can be determined via a measured voltage relative to ground of the corresponding circuit breaker and/or a current flow through the corresponding circuit breaker.

At activity 3200, each of the set of electrical energy monitoring devices can be electrically coupled to a corresponding circuit breaker that is adapted to provide electrical energy to a circuit branch. Each of the set of electrical energy monitoring devices can be mounted in a circuit breaker panel and/or substantially adjacent to the corresponding circuit breaker. Each of the set of electrical energy monitoring devices can be operably yet non-simultaneously couplable to each of a single phase alternating current circuit branch and a three phase alternating current circuit branch.

At activity 3300, an energy monitoring master controller can be communicatively coupled to each of the set of electrical energy monitoring devices. The energy monitoring master controller connectable and/or communicatively coupled to the Internet. The energy monitoring master controller can comprise a touch screen via which user input can be received.

At activity 3400, threshold information can be obtained from a user. The threshold information can be associated with one or more circuit branches and can be indicative of criteria used to provide a notification and/or an alarm to the user regarding one or more circuit branches.

At activity 3500, one or more circuit branches can be monitored. For example, the set of electrical energy monitoring devices can monitor, regarding a corresponding circuit branch, one or more of voltage, electrical current, electrical frequency, apparent power, real power, reactive power, percent load, electrical energy demand, a peak value of electrical current in a predetermined time interval, and/or a peak value of an electrical voltage relative to ground during a predetermined time interval.

At activity 3600, a notification can be rendered. The notification can be indicative that a measured and/or derived electrical parameter exceeds a predetermined threshold. The master controller can be adapted to provide the notification responsive to a determination that a monetary value of energy usage exceeds a predetermined threshold. The predetermined threshold can be entered as a monetary value corresponding to a cost of a predetermined count of kilowatt-hours via a monetary value web page.

At activity 3700, a web page can be transmitted from the energy monitoring master controller to a web browser. The energy monitoring master controller can cause a transmission of a web pace from a web page server of the energy monitoring master controller. The web page server can be adapted to provide circuit breaker information from each of the set of electrical energy monitoring devices via the web page. The web page can be adapted to provide a notification if a predetermined energy usage threshold is exceeded and receive an acknowledgement of the notification from a user.

Figure 4:
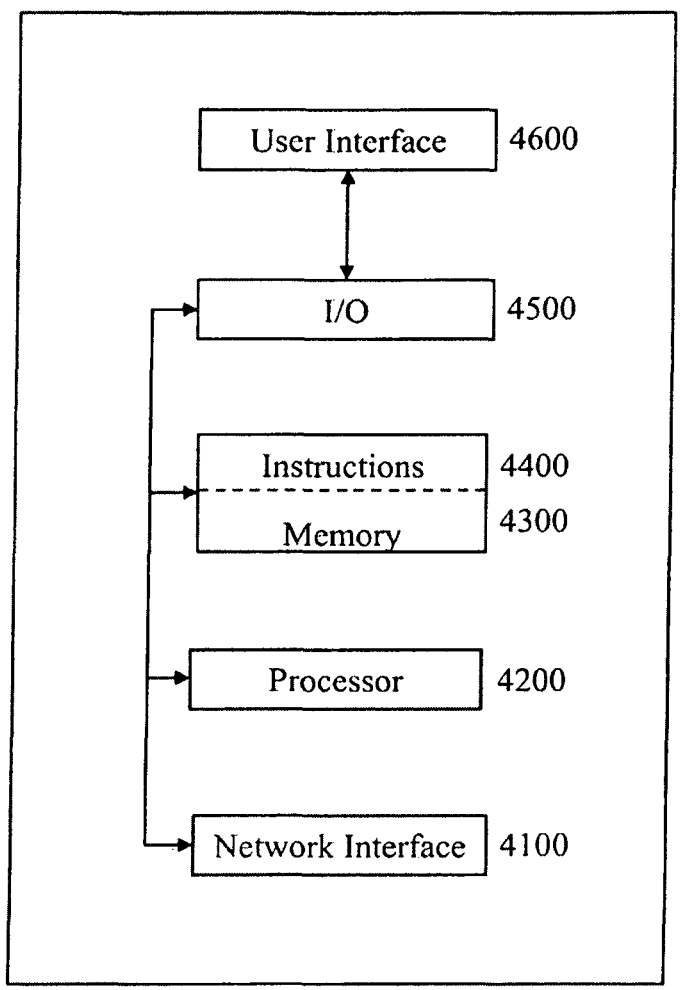
FIG. 4 is a block diagram of an exemplary embodiment of an information device 4000.

FIG. 4 is a block diagram of an exemplary embodiment of an information device 4000, which in certain operative embodiments can comprise, for example, information device 1700, of FIG. 1. Information device 4000 can comprise any of numerous components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
accessible—capable of being contacted by an information device to perform a specific function.
across—from a first side to a second opposing side of.
activity—an action, act, deed, function, step, and/or process and/or a portion thereof.
adapted to—suitable, fit, and/or capable of performing a specified function.
adjacent—in close proximity to, near, next to, and/or adjoining.
alternating current—an electric current that reverses direction in a circuit at regular intervals.
amount—a quantity.
and/or—either in conjunction with or in alternative to.
apparatus—an appliance or device for a particular purpose.
associated with—related to.
at least—not less than.
attach—to fasten, secure, couple, and/or join.
automatically—acting and/or operating in a manner essentially independent of external human influence and/or control. For example, an automatic light switch can turn on upon "seeing" a person in its view, without the person manually operating the light switch.
between—in a separating interval and/or intermediate to.
bill—(n) a request for payment for goods and/or services (v) to send and/or provide a request for payment for goods and/or services.
can—is capable of, in at least some embodiments.
cause—to bring about, provoke, precipitate, produce, elicit, be the reason for, result in, and/or effect.
characteristic—a feature, property, trait, and/or attribute.
circuit—an electrically conductive pathway and/or a communications connection established across two or more switching devices comprised by a network and between corresponding end systems connected to but not comprised by the network.
circuit branch—an electrical circuit comprising an electrical energy-using device and electrically coupled to a source of electrical energy via a circuit breaker.
circuit breaker—a re-settable device adapted to automatically open an alternating current electrical circuit to protect the circuit from damage caused by overload and/or short circuit.
communicatively—linking in a manner that facilitates communications.
comprise—to include but not be limited to, what follows.
condition—existing circumstance.
conduct—to act as a medium for conveying something such as heat and/or electricity.
configure—to design, arrange, set up, shape, and/or make suitable and/or fit for a specific purpose.
connect—to physically join, link, couple, and/or fasten two or more entities.
connectable—made suitable or fit for joining to or by way of a communications circuit.
controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.
corresponding—related, associated, accompanying, similar in purpose and/or position, conforming in every respect, and/or equivalent and/or agreeing in amount, quantity, magnitude, quality, and/or degree.
cost—an amount paid or required in payment for a purchase; a price; and/or an expenditure.
count—(n.) a number reached by counting and/or a defined quantity. (v.) to increment, typically by one and beginning at zero.
couple—to join, connect, and/or link two things together.
current—a flow of electrical energy.
current transformer—a device electrically and/or magnetically couplable to an electric circuit, the device adapted to output a secondary electrical current in response to the electrical current (the "primary current") in the electric circuit, the secondary current typically a predetermined ratio of the primary current.
define—to establish the meaning, relationship, outline, form, and/or structure of; and/or to precisely and/or distinctly describe and/or specify.
detect—to sense, perceive, identify, discover, ascertain, respond to, and/or receive the existence, presence, and/or fact of.
determine—to obtain, calculate, decide, deduce, establish, and/or ascertain.
deviate—depart from a standard and/or norm.

device—an instrumentality adapted to a particular purpose.

each—every one of a group considered individually.

either—one or the other of two.

electrical—relating to producing, distributing, and/or operating by electricity.

electrical energy—energy characterized by, and/or adapted to cause, a flow of electric charge through a conductor.

electrical energy source—an electrical circuit adapted to supply electrical energy to a circuit branch and/or one or more devices.

electrically—of, relating to, producing, or operated by electricity.

electrically couple—to connect in a manner adapted to allow a flow of electricity therebetween.

enclose—to surround.

energy—a measurable physical quantity, with dimensions equivalent and/or convertible to mass times velocity squared, that is conserved for an isolated system.

exceed—to be greater than.

flow—a continuous transfer.

for—with a purpose of.

from—used to indicate a source.

further—in addition.

ground—an electrical potential substantially similar to that of the earth.

have—to possess a characteristic.

implement—to information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

install—to set in position and/or prepare for use.

instructions—directions adapted to perform a particular operation or function. Can be implemented as firmware and/or software.

interface—(n) a boundary across which two independent systems meet and act on and/or communicate with each other. (v) to connect with and/or interact with by way of an interface.

Internet—an interconnected global collection of networks that connect information devices.

kilowatt-hour—a unit of energy that is equivalent to 1,000 watt-hours or approximately 3,600 joules.

load—an electrical energy consuming device and/or system.

local—associated with a predetermined area or region.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—of a form from which an information device can obtain data and/or information.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

master—a machine or component adaptable to control another machine or component.

may—is allowed and/or permitted to, in at least some embodiments.

measure—(n) a quantity ascertained by comparison with a standard. (v) to physically sense, and/or determine a value and/or quantity of something relative to a standard.

method—a process, procedure, and/or collection of related activities for accomplishing something.

microprocessor—a device adapted to perform one or more predetermined tasks, such as acting upon information by manipulating, analyzing, modifying, converting, transmitting the information for use by an executable procedure and/or an information device, and/or routing the information to an output device. A microprocessor can be a central processing unit, a local controller, a remote controller, parallel controller, and/or distributed controller, etc. The microprocessor can be a general-purpose microcontroller, such the Pentium IV series of microprocessor manufactured by the Intel Corporation of Santa Clara, Calif. In another embodiment, the microprocessor can be an Application Specific Integrated Circuit (ASIC) or a Field Programmable Gate Array (FPGA) that has been designed to implement in its hardware and/or firmware at least a part of an embodiment disclosed herein.

MODBUS—a serial communications protocol adapted for use with programmable logic controllers (PLCs).

monetary value—a material worth of something in a units of a currency.

monitor—to observe.

mount—(n) that upon which a thing is attached. (v) to couple, fix, and/or attach on and/or to something.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

neutral—a current carrying conductor in an electrical distribution system that is electrically coupled to a bus having a common electrical potential relative to ground.

non—not.

not—a negation of something.

notification—information regarding an event.

obtain—to receive, get, take possession of, procure, acquire, calculate, determine, and/or compute.

occur—to take place.

one—a singular unit.

operative—being in effect; operating.

panel—a housing adapted to contain electrical components, such as circuit interrupters and/or circuit breaker, adapted to manage electrical energy to an electrical device and/or in a circuit. A breaker panel can be adapted to manage provision of electrical energy, at least on a temporary basis, to an electrical device such as an electrically powered tool, light, motor, information device, power strip, breaker panel, and/or machine, etc. A breaker panel can be adapted, for example, to supply electrical energy at a location such as a home, industrial facility, office building, warehouse, store, commercial building, medical facility, school, government building, construction site, sports facility, mobile plant, camp site, recreational facility, trailer home, emergency site, and/or a farm, etc. A breaker panel can be fabricated from a material such as a plastic material, aluminum, stainless steel, and/or painted carbon steel, etc. A breaker panel can define a substantially rectangular cross section.

phase—a measure of an angular relationship between time-varying currents and voltages in an AC circuit.

phase angle—an angle expressing a phase relation between an AC current and an AC voltage.

plurality—the state of being plural and/or more than one.

portion—a part, component, section, percentage, ratio, and/or quantity that is less than a larger whole. Can be visually, physically, and/or virtually distinguishable and/or non-distinguishable.

power—energy, a measure of energy and/or work, and/or a rate at which work is done, expressed as the amount of work per unit time and commonly measured in units such as watt and horsepower.

power factor—a ratio of true power to apparent power. A power factor of 1.0 indicates that current and voltage are in phase.

power supply—one or more electrically coupled components configured to provide electrical energy to a device and/or system.

predetermined—established in advance.

predetermined threshold—a standard established in advance.

provide—to furnish or supply.

receive—to gather, take, acquire, obtain, accept, get, and/or have bestowed upon.

regarding—pertaining to.

relative—considered with reference to and/or in comparison to something else.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

responsive—reacting to an influence and/or impetus.

said—when used in a system or device claim, an article indicating a subsequent claim term that has been previously introduced.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

server—an information device and/or a process running thereon that is adapted to be communicatively coupled to a network and that is adapted to provide at least one service for at least one other information device communicatively coupled to the network and/or for at least one process running on the other information device. A common example is a file server, which has a local disk and services requests from remote clients to read and write files on that disk. A server can also provide access to resources, such as programs, shared devices, etc.

set—a related plurality of predetermined elements; and/or one or more distinct items and/or entities having a specific common property or properties.

single—existing alone or consisting of one entity.

strip—a relatively long piece, usually of substantially uniform width.

substantially—to a considerable, large, and/or great, but not necessarily whole and/or entire, extent and/or degree.

substantially adjacent—placed at a distance of less than six inches away. For example, an object is substantially adjacent to another object when separated by, in inches: 6, 5.4, 4, 3.2, 3, 2.75, 2.375, 2.2, 2, 1.875, 1.7, 1.5, 1.01, 1, 0.89, 0.75, 0.5, 0.25, 0.1, 0.01, and/or any value or subrange therebetween.

supply—to make available for use.

surround—to encircle, enclose, and/or confine on several and/or all sides.

system—a collection of devices, machines, articles of manufacture, and/or processes, the collection designed to perform one or more specific functions.

three—one plus one plus one.

threshold—a point that when exceeded produces a given effect or result.

through—in one side and out the opposite or another side of, across, among, and/or between.

touch screen—an input/output device adapted to display information and to accept input from a user via the user touching and/or nearly touching displayed words and/or or symbols.

transmission—a conveyance of information from one location to another.

transmit—to provide, furnish, supply, send as a signal, and/or to convey (e.g., force, energy, and/or information) from one place and/or thing to another.

usage—consumption.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a measured, assigned, determined, and/or calculated quantity or quality for a variable and/or parameter.

via—by way of and/or utilizing.

voltage—(a.k.a., "potential difference" and "electro-motive force" (EMF)) a difference in electrical potential between any two conductors of an electrical circuit and/or a quantity, expressed is a signed number of Volts (V), and measured as a signed difference between two points in an electrical circuit which, when divided by the resistance in Ohms between those points, gives the current flowing between those points in Amperes, according to Ohm's Law.

web page—a document, entry screen, and/or information accessible from a server via Hypertext Transport Protocol and/or a specific Uniform Resource Locator.

wherein—in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
a set of electrical energy monitoring devices, each of said set of electrical energy monitoring devices adapted to determine an energy usage by a corresponding circuit branch electrically coupled to an electrical energy source via a corresponding circuit breaker, said energy usage determined via a measured voltage relative to neutral at said corresponding circuit breaker and a current flow through said corresponding circuit breaker, each of said set of electrical energy monitoring devices adapted to be mounted in a circuit breaker panel, each of said set of electrical energy monitoring devices adapted to be mounted substantially adjacent to said corresponding circuit breaker, each of said set of electrical energy monitoring devices operably yet non-simultaneously couplable to each of a single phase alternating current circuit branch and a three phase alternating current circuit branch,
wherein each of said set of electrical energy monitoring devices measures current and voltage irrespective of whether a single phase alternating current circuit branch or a three phase alternating current circuit branch is present in the corresponding circuit branch;
an energy monitoring master controller adapted to be communicatively coupled to each of said set of electrical energy monitoring devices, said master controller comprising a web page server connectable to the Internet, said web page server adapted to provide circuit breaker information from each of said set of electrical energy monitoring devices via a web page.

2. The system of claim 1, further comprising:
said circuit breaker panel.

3. The system of claim 1, wherein:
said circuit breaker panel is adapted to operatively mount a first strip substantially adjacent to a first subset of circuit breakers and a second strip substantially adjacent to a second set of circuit breakers, each of said set of electrical energy monitoring devices adapted to be placed on one of said first strip and said second strip.

4. The system of claim 1, wherein:
each of said set of electrical energy monitoring devices comprises a power supply.

5. The system of claim 1, wherein:
each of said set of electrical energy monitoring devices comprises a microprocessor.

6. The system of claim 1, wherein:
each of said set of electrical energy monitoring devices comprises a network interface.

7. The system of claim 1, wherein:
each of said set of electrical energy monitoring devices comprises a voltage sensor adapted to measure an electrical voltage of the corresponding circuit branch, each of said set of electrical energy monitoring devices comprises a current sensor adapted to measure an electrical current flowing through the corresponding circuit branch.

8. The system of claim 1, wherein:
each of said set of electrical energy monitoring devices comprises a device adapted to measure a flow of electrical power.

9. The system of claim 1, wherein:
each of said set of electrical energy monitoring devices comprises a device adapted to determine a power factor.

10. The system of claim 1, wherein:
each of said set of electrical energy monitoring devices comprises a current transformer.

11. The system of claim 1, wherein:
each of said set of electrical energy monitoring devices is adapted to monitor a characteristic of a phase of an alternating current.

12. The system of claim 1, wherein:
said master controller is adapted to provide an alarm if a voltage exceeds a predetermined threshold.

13. The system of claim 1, wherein:
said master controller is adapted to provide an alarm if an electrical current exceeds a predetermined threshold.

14. The system of claim 1, wherein:
said master controller is adapted to provide an alarm if a phase angle deviates from a predetermined threshold by a predetermined amount.

15. The system of claim 1, wherein:
said master controller is adapted to provide a notification responsive to a determination that a count of kilowatt-hours exceeds a predetermined threshold.

16. The system of claim 1, wherein:
said master controller is adapted to provide a notification responsive to a determination that a monetary value of energy usage exceeds a predetermined threshold.

17. The system of claim 1, wherein:
said master controller is adapted to provide a notification responsive to a determination that a monetary value of energy usage exceeds a predetermined threshold, said predetermined threshold entered as a monetary value corresponding to a cost of a predetermined count of kilowatt-hours via a monetary value web page.

18. The system of claim 1, wherein:
said master controller comprises a touch screen.

19. The system of claim 1, wherein:
said master controller is adapted to render values measured by said system via a local user interlace.

20. The system of claim 1, wherein:
said master controller is adapted to provide information to a billing system, said billing system adapted to provide a bill associated with energy usage by a load of the corresponding circuit branch.

21. The system of claim 1, wherein:
master controller is communicatively coupled to a plurality of meters in a network utilizing a MODBUS protocol.

22. The system of claim 1, wherein:
master controller is communicatively coupled to the Internet.

23. A method comprising:
causing a transmission of a web page from a web page server of an energy monitoring master controller, said master controller adapted to be communicatively coupled to each of a set of electrical energy monitoring devices, said master controller connectable to the Internet, said web page server adapted to provide circuit breaker information from each of said set of electrical energy monitoring devices via a web page, each of said set of electrical energy monitoring devices adapted to determine an energy usage by a corresponding circuit branch electrically coupled to an electrical energy source via a corresponding circuit breaker, said energy usage determined via a measured voltage relative to ground at said corresponding circuit breaker and a current flow through said corresponding circuit breaker, each of said set of electrical energy monitoring devices adapted to be mounted in a circuit breaker panel and substantially adjacent to said corresponding circuit breaker, each of said set of electrical energy monitoring devices operably yet non-simultaneously couplable to each of a single phase alternating current circuit branch and a three phase alternating current circuit branch, wherein each of said set of electrical energy monitoring devices measures current and voltage irrespective of whether a single phase alternating current circuit branch or a three phase alternating current circuit branch is present in the corresponding circuit branch, said web page adapted to provide a notification if a predetermined energy usage threshold is exceeded and receive an acknowledgement of said notification from a user.

24. The method of claim 23, further comprising:

rendering an alarm at an energy monitoring master controller, said alarm associated with an automatically detected condition in at least one of said corresponding circuit branches, said master controller adapted to be communicatively coupled to each of said set of electrical energy monitoring devices, said master controller connectable to the Internet, said master controller comprising said web page server adapted to provide said web page.

* * * * *